United States Patent [19]

De Salme

[11] Patent Number: 5,059,875
[45] Date of Patent: Oct. 22, 1991

[54] MOTOR AND CONTROLLER

[76] Inventor: William A. De Salme, 6223 Highway 87 E. Suite 13, San Antonio, Tex. 78222

[21] Appl. No.: 448,347

[22] Filed: Dec. 11, 1989

[51] Int. Cl.[5] .............................................. H02P 6/02
[52] U.S. Cl. .................................... 318/138; 318/254; 318/480
[58] Field of Search ................ 318/138, 254, 439, 480

[56] References Cited

U.S. PATENT DOCUMENTS

| | | | |
|---|---|---|---|
| 3,946,292 | 3/1976 | Tanikoshi | 318/138 |
| 4,208,621 | 6/1980 | Hipkins et al. | 318/254 X |
| 4,463,291 | 7/1984 | Usry | 318/254 |
| 4,546,293 | 10/1985 | Peterson et al. | 318/138 X |
| 4,717,864 | 1/1988 | Fultz | 318/480 X |
| 4,827,196 | 5/1989 | Odell | 318/480 X |

Primary Examiner—Bentsu Ro
Attorney, Agent, or Firm—John P. Halvonik

[57] ABSTRACT

An apparatus is provided that comprises a DC motor and a controller adapted to control the motor. The motor has a permanent magnet rotor and an electromagnetic stator. The rotor is divided into three permanent magnet sections which are separated by aluminum spacers. The stator has three groups of coils which are arranged around the three permanent magnet sections. The controller sequentially activates each of the three groups of coils at a predetermined rate thereby controlling the speed of the motor.

7 Claims, 4 Drawing Sheets

MOTOR AND CONTROLLER

BACKGROUND OF THE INVENTION

1. Field of the Invention

The invention relates to a direct current motor without a commutator and an electronic control system adapted to control the motor.

2. Description of the Prior Art

Electronic control systems which obviate the need for brushes and commutators are well known in the art. Typically, the motor control systems of the prior art perform many functions. U.S. Pat. No. 4,622,500 is an example of a prior art motor controller. In addition to controlling motor speed and direction of rotation, the controller also has means for ensuring accurate speed control by measuring actual rotation speed and generating a speed error control signal. The controller also has means for eliminating vibrations in the load driven by the motor. While controllers of this type are very effective they are also complex, requiring a number of components which in turn means a decrease in reliability and an increase in cost.

Accordingly, it is an object of the present invention to provide a DC motor and a controller therefor, which controller is reliable and relatively inexpensive, requiring only a few readily available parts.

SUMMARY OF THE INVENTION

An electromagnetic apparatus comprising a DC motor and a controller adapted therefor. The motor has a permanent magnet rotor and an electromagnetic stator. The rotor is divided into three permanent magnet sections which are separated by aluminum spacers. The stator has three groups of coils which are arranged around the three permanent magnet sections. The controller sequentially activates each of the three groups of coils at a predetermined rate thereby controlling the speed of the motor.

DETAILED DESCRIPTION OF THE INVENTION

Figure 1:
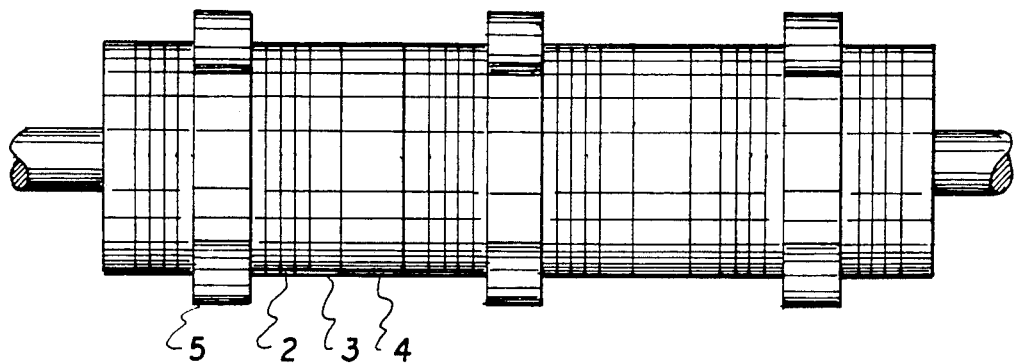
FIG. 1 is a side view of the rotor of the present invention.
Figure 2:
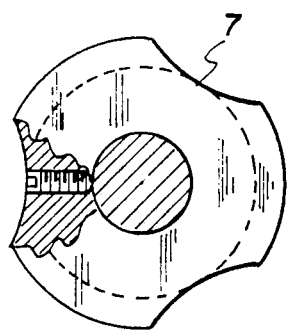
FIG. 2 is a cross sectional view of the rotor.

Referring now to FIG. 1, the rotor arrangement of the present invention is shown. The rotor has three permanent magnet sections which are separated by disc shaped aluminum spacers 4. The permanent magnet sections constitute a plurality of disc shaped magnets 2, with an equal number of the magnets on either side of a of a rotor disc 5. The magnets 2 are all mounted about the shaft with the same magnetic pole orientation. The magnets 2 and the rotor discs 5 are secured about the shaft 1 with a pair of steel end plates 3. In FIG. 2, the rotor discs 5 have three arcuate indentations 7 spaced 120 degrees apart. The indentations 7 are about one quarter inch deep in the preferred embodiment. Also in the preferred embodiment the rotor discs 5 are one half inch thick, the end plates 3 are one quarter inch thick and the aluminum spacers are one half inch thick.

Figure 3:
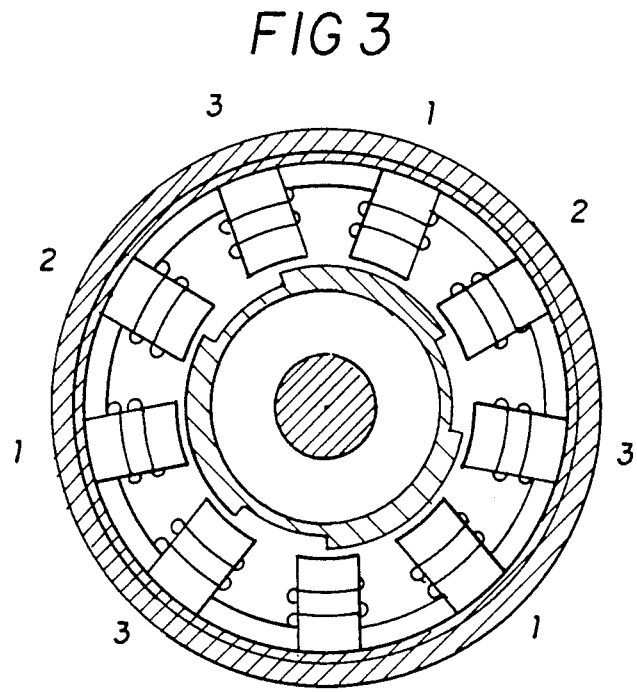
FIG. 3 is a side view of all three rotor coils with numeric designations to indicate the firing order
Figure 5:
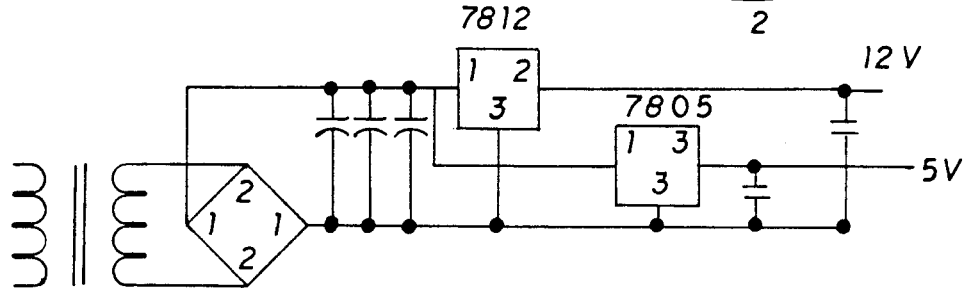
FIG. 5 is a circuit diagram of the power supply to be used with the present invention.

Referring to FIG. 3, there are three stator sections each of which is mounted about a permanent magnet section. Each stator section has three pole pieces, all of which are north oriented.

Figure 4:
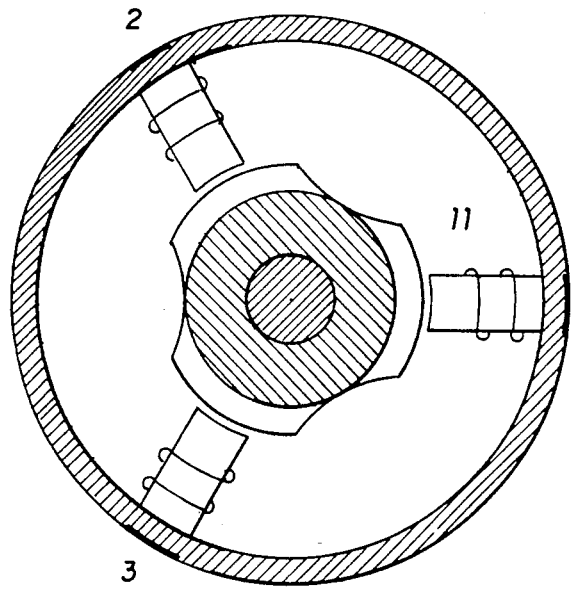
FIG. 4 is a cross sectional view of both the rotor and stator of the present invention.
Figure 7:
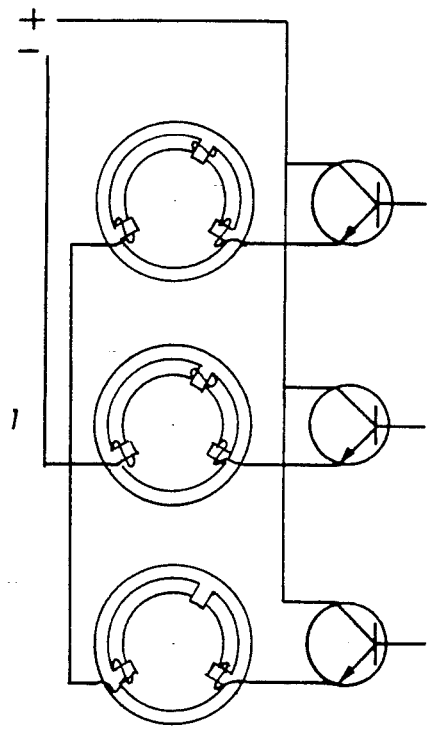
FIG. 7 is a circuit diagram showing the connection of the motor controller to the stator circuit.
Figure 9A:
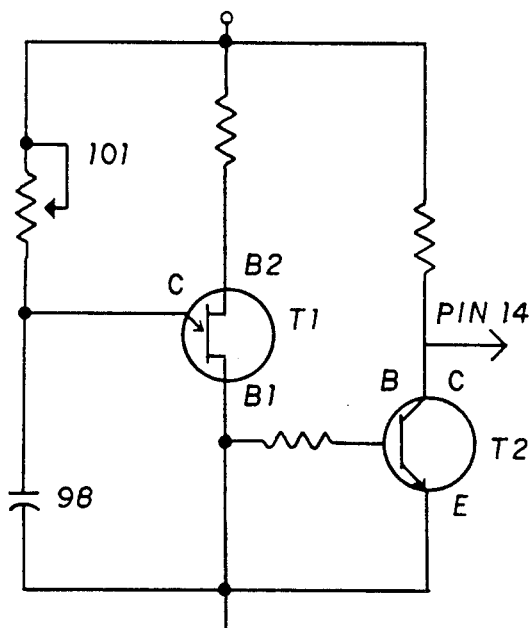
FIGS. 9A and 9B are alternative pulse generation systems.
Figure 9B:
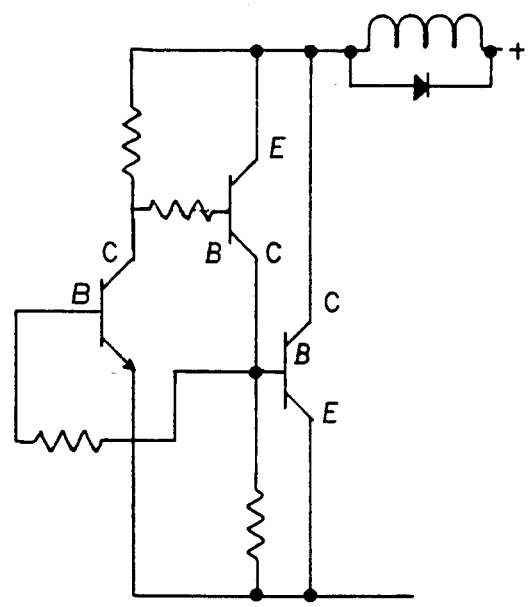

Referring to FIG. 4 the three pole pieces 11 are spaced 120 degrees apart. There is a one thirty second of an inch air gap between the pole pieces 11 and the rotor discs.

Figure 6:
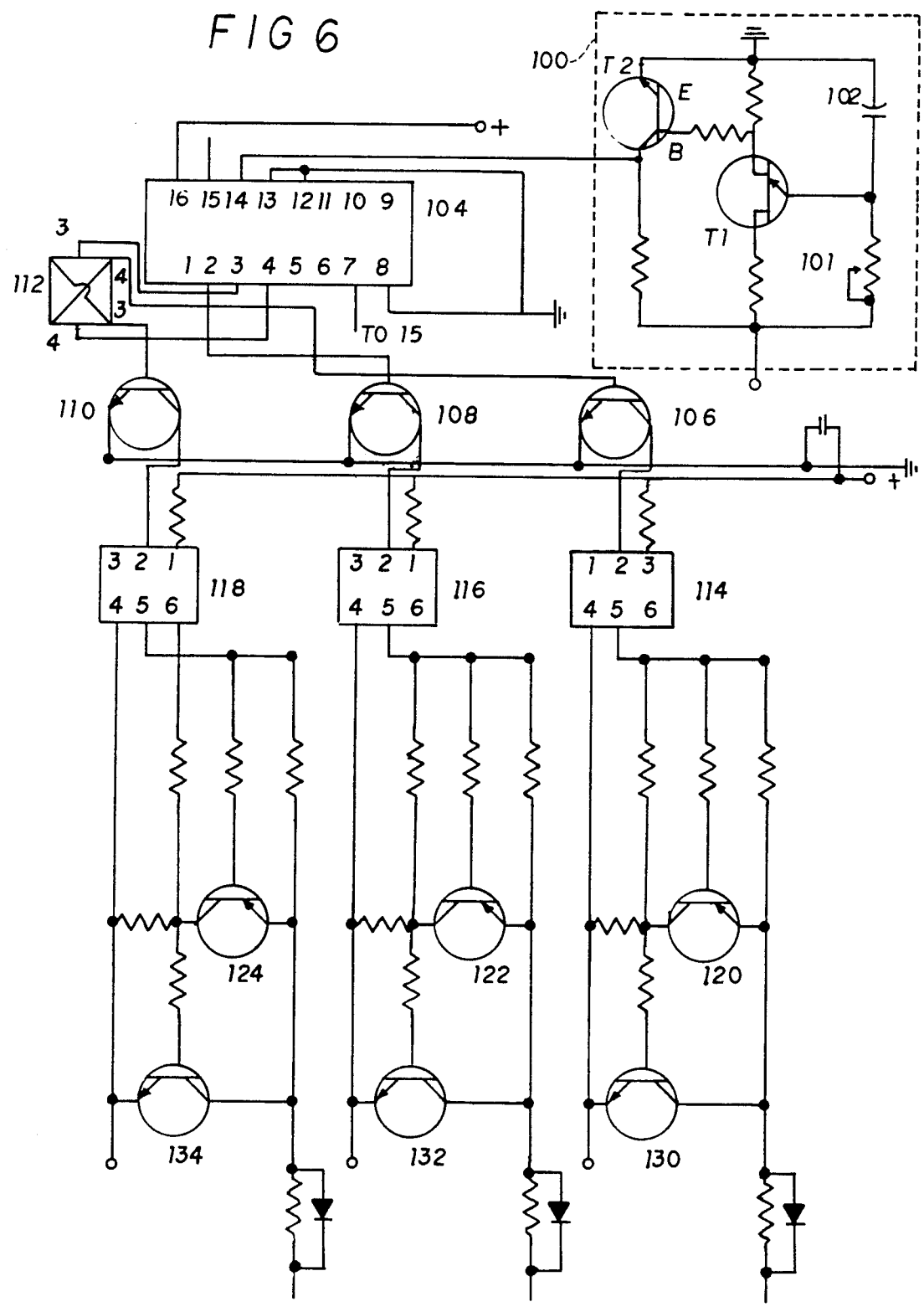
FIG. 6 is a detailed circuit diagram of the motor controller of the present invention.

Referring to FIG. 6; pulse generator 100 is used to generate a pulse train for CMOS counter circuit 104. The width of the pulses are determined by capacitor 102 and adjustable resistor 101. When capacitor 102 charges up, it turns on the transistor T1. When transistor T1 turns on, it causes transistor T2 to conduct. When capacitor 102 discharges, transistor T1 is turned off causing transistor T2 to turn off.

The output of the pulse generators is applied to a counter circuit 104. The counter circuit 104 can be programmed to sequentially output pulses at its output leads. A commercially available 4017 counter can be used for this purpose.

The output pulses of the counter circuit are coupled to a double pole double throw (DPDT) switch 112. This switch is used to reverse the sequence of the counter circuit output pulses. The operation of the DPDT switch will be more fully explained later.

The output pulses are then sequentially applied to transistors 106-110 in a sequential manner. The transistors 106-110 output an amplified pulse which is used to drive opto isolators 114 to 118.

The outputs of the opto isolators are used to drive switching transistors 120-124. The switching transistors 120.124 turn on power transistors 130-134 which allow power to be applied to the stator coils.

Figure 8:
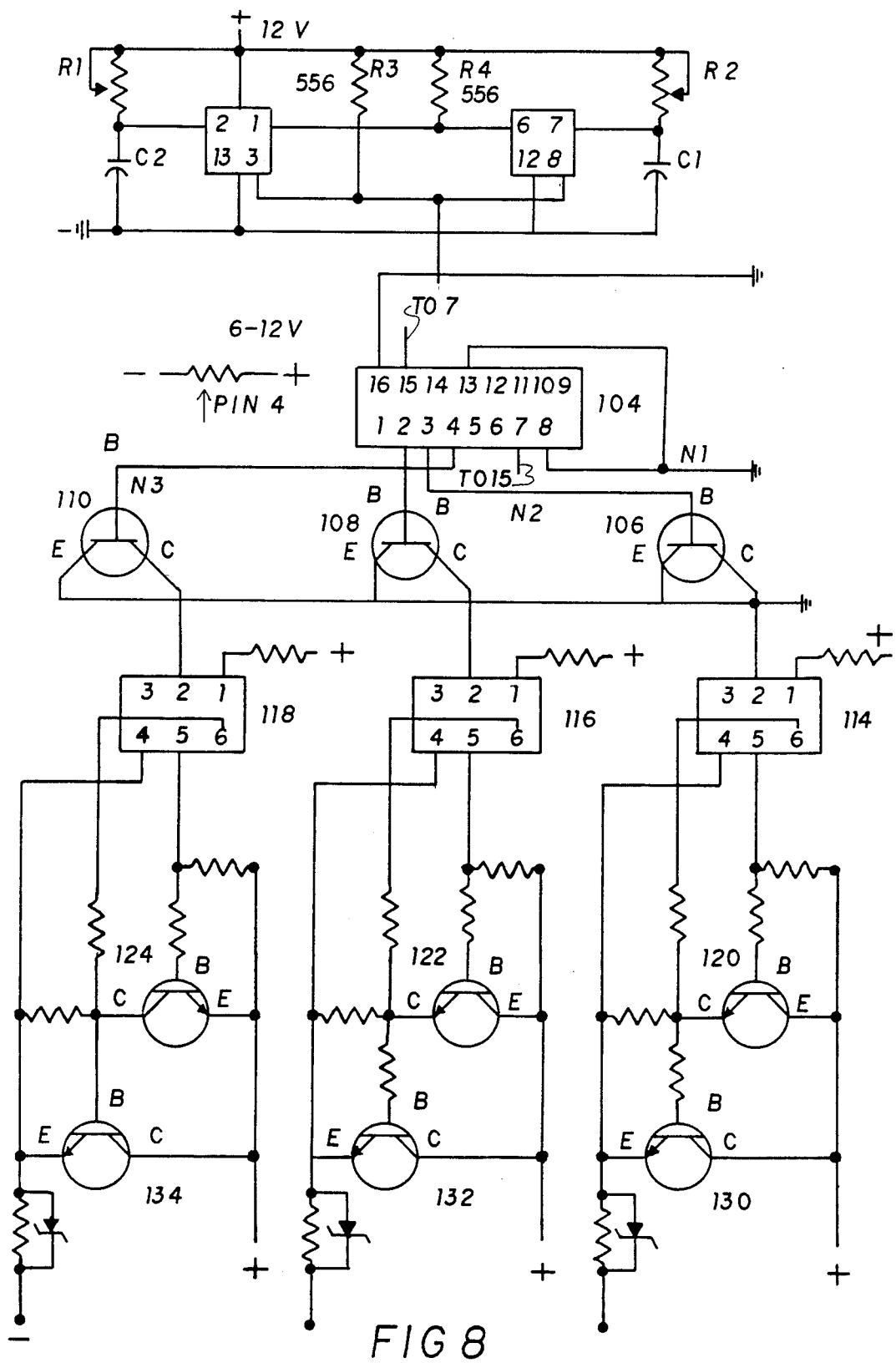
FIG. 8 is a schematic of the overall system.

In operation, the variable resistors R1 and R2 (as shown in FIG. 8) are set to provide a desired motor speed. The pulse generators 100 and 102 output pulses which are coupled to an input lead of the counter 104. The counter 104 sequentially applies pulses to each of the opto isolator circuits 114-118 via amplifying transistors 106-108. In order to reverse the motor, the sequence of the pulses applied to the opto isolators must be reversed. This is done by changing the position of the DPDT switch 112. The opto isolators output a signal which drives the switching transistors 130-134.

Having described a preferred embodiment of the present invention, modifications and alternatives may become apparent to those skilled in the art.

I claim:

1. A motor controller for a brushless DC motor having a permanent magnet rotor and a stator with stator windings comprising:
   (a) said rotor having three permanent magnet sections mounted about a central shaft; means for securing said permanent magnet sections on said shaft; each of said sections having a plurality of disc shaped magnets, and a spacing means for separating said permanent magnet sections;

(b) a rectifier circuit rectifying an AC power source to supply rectified current to said stator windings;

(c) pulse signal generation means for generating a pulse train signal having means for varying the pulse width and pulse rate of said signal so that the speed of said motor can be controlled;

(d) control signal means connected to said pulse signal generation means for receiving said pulse signal and sequentially outputting motor control signals to said stator windings so that power is selectively applied to said stator windings;

(e) cross-wired, double-pole double-throw switch for reversing the sequence of said pulse signals;

(f) amplifying means connected to said control signal means for receiving and amplifying said control signals;

(g) optical isolation means connected to receive said amplified control signals.

2. The apparatus of claim 1 wherein said magnets are all of the same polarity.

3. The apparatus of claim 2, wherein said stator windings comprise 3 sections, each of said sections surrounding one of said permanent magnet sections and each of said stator winding sections having three pole pieces, each of said pole pieces being wound with coils of the same polarity so that each of said three stator winding sections has three pole pieces with coils.

4. The controller of claim 3 wherein said coils of each said stator winding section are connected in series, so that coils in the same winding section are in series.

5. The apparatus of claim 4 wherein said spacing means are aluminum discs.

6. The apparatus of claim 5 wherein said aluminum discs are about one-quarter of an inch in width.

7. The controller of claim 6 said pole pieces are separated from the said aluminum discs by an air gap or about one thirty-second of an inch.

* * * * *